June 5, 1945.  F. W. CREW  2,377,542
AUTOMOBILE WHEEL LOCK
Filed Dec. 10, 1942
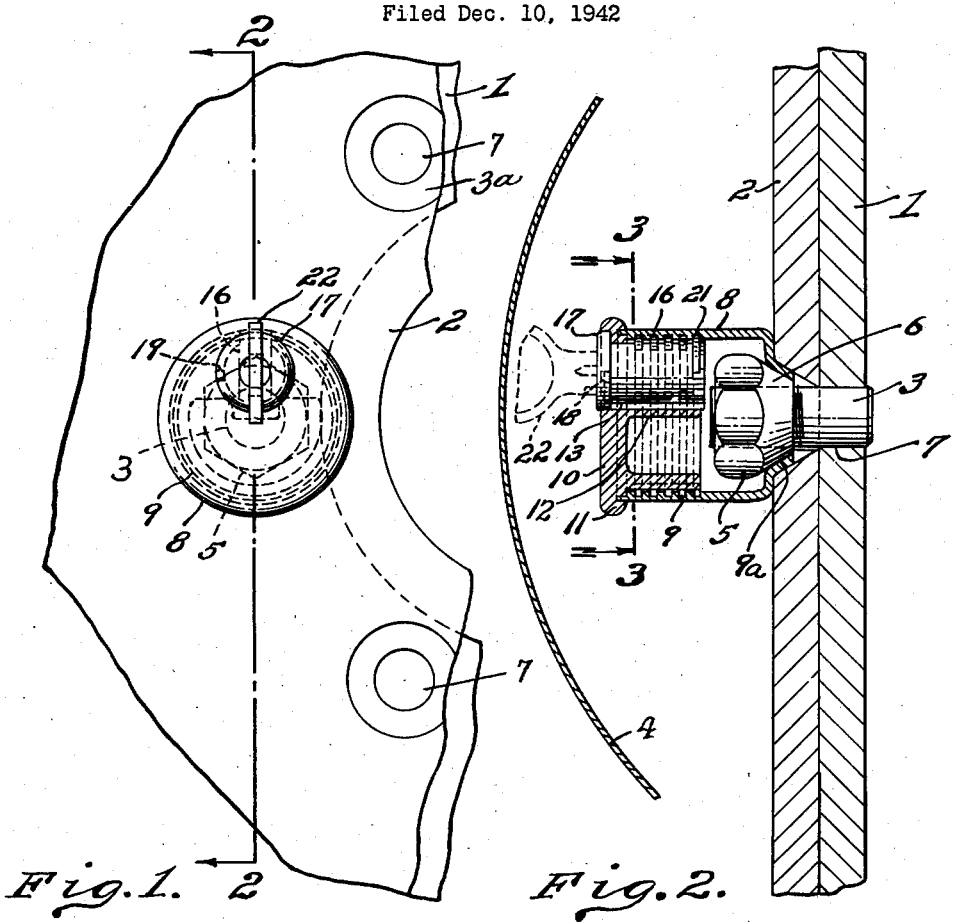
Fig.1.  Fig.2.
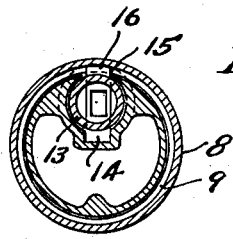
Fig.3.
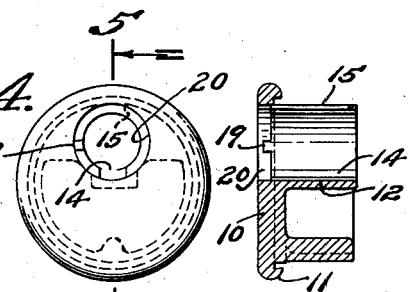
Fig.4.
Fig.5.
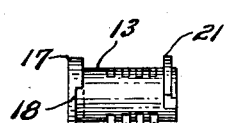
Fig.6.
INVENTOR.
Frederick W. Crew
BY
*Charles E. Riley*
ATTORNEY Patented June 5, 1945

2,377,542

UNITED STATES PATENT OFFICE 2,377,542

AUTOMOBILE WHEEL LOCK

Frederick W. Crew, Detroit, Mich.

Application December 10, 1942, Serial No. 468,594

3 Claims. (Cl. 70—232)

This invention relates to automobile wheel locks, the purpose being to provide a new and unique device for attachment to a bolt utilized in securing the hub of the wheel to a companion element on the driving shaft and in its preferred form comprises a hollow casing into which a bolt extends from the plate on the driving shaft and a cover member on the casing carrying a lock mechanism by which the cap is secured to the casing or may be unlocked to permit removal of the cap and lock to thereby provide access to the bolt.

These and other objects and features of the invention are hereinafter more fully described and claimed and shown in the preferred form in the accompanying drawing in which—

Fig. 1 is a front elevation showing a part of the wheel hub and of the plate attached to the driving shaft including an end elevation of my improved lock mechanism.

Fig. 2 is a section taken on line 2—2 of Fig. 1.

Fig. 3 is a section through the lock device taken on line 3—3 of Fig. 2.

Fig. 4 is an end elevation of the cap member.

Fig. 5 is a section taken on line 5—5 of Fig. 4.

Fig. 6 is a side elevation of a convenient lock element.

The invention seeks to provide a means for preventing unauthorized persons from removing a wheel and rim from the axle and in Figs. 1 and 2 the plate indicated at 1 is to be understood as being fixed to the axle (not here shown) and to which the wheel hub is secured.

The plate 1 is usually ring like in form as will be understood from Fig. 1 and is provided with a series of apertures 7 to receive the studs 3. Coned apertures 3a for the usual bolts or studs are also provided in the plate 2 as is the usual practice. Automobile wheels are often stolen by simply removing the hub cap 4 to thereby provide access to the nuts 5 on the studs as indicated in Fig. 2 by means of which the hub of the wheel is secured to the plate on the axle. All the nuts are usually provided with a coned inner face 6 engaging in the coned apertures 3a therefor in the wheel hub.

My improved wheel lock comprises a cylindrical casing 8 having a coned flange 9a for seating in the cone aperture 3a through which the stud 3 extends. The internal surface of the body of the casing 8 is provided with a series of circular grooves 9 in parallel relation and the cap member 10 therefor has a flange 11 adapted to fit over the open outer end of the casing thus preventing access thereto. This cap has an inwardly extending cylindrical portion or shell 12 to receive the lock cylinder or barrel 13 shown in Fig. 5. The said cylindrical portion 12 is provided with a groove 14 on one side and on the diametrically opposite side has a slot 15 which faces the inner periphery of the casing 8. The lock barrel 13 has the usual tumblers 16 and the head 17 of the barrel has a notch 18 on its inner face into which a lug 19 is seated and which extends into the aperture 20 as shown in Fig. 5 and thus limits the extent of rotation of the barrel. The tumblers 16 are shown in projected position in Fig. 2 and engaging in the cylindrical grooves 9 on the inner face of the casing 8.

In addition to the usual tumblers 16 a fixed lug 21 is provided which also engages in a groove 9 when the parts are in the position shown in Fig. 2. By insertion of the key the tumblers 16 are retracted from engagement with the grooves provided therefor and, by subsequent rotation of the key, a one-fourth turn, the fixed lug 21 is withdrawn from its groove thus permitting removal of the lock and the cap member 10 from the casing 8 thereby providing access to the nut 5.

The lock barrel per se is commonly known and is in common use and, by introduction of a key 22 into the barrel through the usual aperture provided therefor, the tumblers 16 are withdrawn to a position flush with the surface of the barrel as indicated in Fig. 6 but the member 21 is not thus withdrawn from engagement with its groove. However, by rotation of the key, the barrel is turned approximately one-fourth turn as is permitted by the lug 19 riding in the notch 18 of the barrel head and this rotative movement of the barrel withdraws the member 21 from engagement in the groove thereby permitting the cap and barrel to be removed as a unit from the casing 8. The nut 5 is thus exposed and removal thereof is permitted as by means of the socket wrench, not shown. The remaining studs 3 by which the hub 2 is secured to the axle element 1 are always in position to be removed in the ordinary way but by preventing removal of the nut of one of the studs by means of my improved wheel lock it is not possible to remove the wheel from the axle and thus theft of the wheel and tire thereon is prevented. In reassembly of the wheel with the axle the nuts on the studs 3 are applied in the usual manner and the casing 8 is applied to one of the studs 3. The nut 5 may then be introduced thereon to the position shown in Fig. 2 and thereafter the cap 10 carrying the lock barrel 13 is positioned on the outer end of the casing and the key turned to turn the lock barrel to the position shown in Fig. 1 and upon removal of the key the tumblers 16 automatically project into the grooves 9 thus preventing access to the nut 5.

As before stated the lock barrel having the tumblers 16 and the fixed member 21 is a commonly known structure in which the tumblers are withdrawn from engagement in the groove by introduction of the key into the lock barrel and by removal of the key the tumblers automatically project to the locked position shown in Fig. 2.

From the foregoing description it is believed evident that the various features and objects of the invention are attained by the structural arrangement and position of the parts as described and that various changes may be made without departing from the spirit and scope of the invention as set forth in the appended claims.

Having thus fully described my invention, its utility and mode of operation, what I claim and desire to secure by Letters Patent of the United States is:

1. A lock for preventing removal of a wheel from relationship with a driving axle to which it is secured by means of bolts, comprising a casing having an open outer end and adapted at its inner end to be secured in position by the nut on a wheel retaining bolt extending into the casing, a cap providing an enclosure for the open outer end of the casing and normally preventing access to the nut therewithin, a lock carried by the cap including a rotatable lock barrel and tumblers normally projecting radially therefrom and retractable by insertion of a key, the said casing having spaced circular grooves engageable by the tumblers when the lock barrel is in one rotative position and the lock barrel further having an element fixed for rotation therewith and engaging a groove of the casing when the barrel is in locked position, providing means whereby rotation of the barrel by the key disengages said element from the groove permitting the cap and lock barrel to be removed as a unit from the casing to permit access to the nut therewithin.

2. An automobile wheel lock comprising a casing secured in position at its inner end on the wheel hub in the usual manner as by a nut on a wheel retaining bolt, said casing having an open outer end, a cap providing a closure for the casing, a lock carried by the cap, said lock comprising a lock barrel including tumblers cooperative with means provided within the casing to lock said cap in position, the said tumblers being retractable by insertion of a key, and a secondary locking means fixed to rotate with the lock barrel and disengageable from locked relation with the casing through rotation of the lock barrel by means of the key.

3. An automobile wheel lock, comprising a casing secured to a retaining bolt housed within the hub and by means of which a wheel may be secured to the axle and accessible by removal of the hub cap, a lock device comprising a casing having an outer open end and an inner end into which a wheel retaining bolt extends and which is secured in position by a nut on the bolt, said casing having a series of parallel grooves peripherally of the inner face of the casing wall, a cap including a chamber open on one side to the interior of the casing when the cap is positioned therein, a lock barrel insertible in the chamber, tumblers on the lock barrel engaging in the grooves when the barrel is in locking position, and a lug carried by the lock barrel and also engaging in a groove when the barrel is in locked position, said barrel being rotatable by a key whereby the lug is disengaged from the groove to permit withdrawal of the barrel and the cap from the casing.

FREDERICK W. CREW.